United States Patent
Wang et al.

(10) Patent No.: US 9,485,179 B2
(45) Date of Patent: Nov. 1, 2016

(54) APPARATUS AND METHOD FOR SCALABLE AND FLEXIBLE TABLE SEARCH IN A NETWORK SWITCH

(71) Applicant: Cavium, Inc., San Jose, CA (US)

(72) Inventors: Weihuang Wang, Los Gatos, CA (US); Srinath Atluri, Fremont, CA (US)

(73) Assignee: Cavium, Inc., San Jose, CA (US)

( * ) Notice: Subject to any disclaimer, the term of this patent is extended or adjusted under 35 U.S.C. 154(b) by 30 days.

(21) Appl. No.: 14/540,868

(22) Filed: Nov. 13, 2014

(65) Prior Publication Data

US 2016/0142316 A1    May 19, 2016

(51) Int. Cl.
  *H04L 12/933* (2013.01)
  *H04L 12/743* (2013.01)

(52) U.S. Cl.
  CPC ................. *H04L 45/7457* (2013.01)

(58) Field of Classification Search
  CPC .................................................. H04W 28/14
  USPC ........................................................ 370/392
  See application file for complete search history.

(56) References Cited

U.S. PATENT DOCUMENTS

| | | | |
|---|---|---|---|
| 6,141,738 A | 10/2000 | Munter | |
| 7,111,071 B1 | 9/2006 | Hooper | |
| 7,724,734 B1 | 5/2010 | Grosser | |
| 7,827,218 B1 | 11/2010 | Mittal | |
| 2001/0042130 A1 | 11/2001 | Brown | |
| 2010/0293327 A1 | 11/2010 | Lin | |
| 2011/0082866 A1 | 4/2011 | Brown | |
| 2012/0131288 A1* | 5/2012 | Box | G06F 15/7867 711/154 |
| 2012/0243539 A1 | 9/2012 | Keesara | |
| 2013/0036185 A1* | 2/2013 | Ansari | G06N 5/02 709/212 |
| 2014/0071985 A1* | 3/2014 | Kompella | H04L 41/5019 370/389 |
| 2014/0269723 A1 | 9/2014 | Wang | |
| 2014/0321467 A1* | 10/2014 | Wang | H04L 45/745 370/392 |
| 2015/0186516 A1* | 7/2015 | Tran | H04L 29/00 707/706 |

* cited by examiner

*Primary Examiner* — Omar Ghowrwal
*Assistant Examiner* — Angel Brockman
(74) *Attorney, Agent, or Firm* — David T. Xue; Duane Morris LLP

(57) ABSTRACT

A network switch comprises a packet processing pipeline including a plurality of packet processing clusters configured to process a received packet through multiple packet processing stages based on table search/lookup results. The network switch further includes a plurality of search logic units each corresponding one of the plurality of packet processing clusters, wherein each of the search logic units is configured to convert a unified search request of a table from its corresponding packet processing cluster to a plurality table search commands specific to one or more memory clusters that maintain the table, provide the plurality table search commands specific to the memory clusters in parallel and collect and provide the table search results from the memory clusters to the corresponding packet processing cluster. The network switch further includes said one or more memory clusters configured to maintain the table to be searched, search the table in parallel according to the plurality table search commands from the search logic unit, and process and provide the table search results to the search logic unit.

32 Claims, 11 Drawing Sheets

800

| Field | Width | Description |
|---|---|---|
| Per SRAM pool, prefix table | | |
| tile_start | 4 | tile_start <= tile_end <= 9, maximum 10 tiles for prefixes. |
| tile_end | 4 | |
| hash_seed_way_{0..9} | 11 X 10 | Seed for CRC hash function |
| tread_{0..9} | 8 X 10 | Number of MSB to hash from |
| pool_extension | 1 | If set, table also occupies the extension pool. |
| Per SRAM pool, NHI table | | |
| tile_start | 4 | |
| tile_end | 4 | |
| pair_per_entry | 4 | A NHI table entry is 128-bit, containing multiple pairs of |
| nhi_size | 5 | {NH_blk_size, NH_blk_addr} |
| Per SRAM pool, NH table | | |
| tile_start | 4 | |
| tile_end | 4 | |
| data_size | 4 | In unit of 32-bit word |
| return_nhi_addr | 1 | Return nhi_addr or nh_addr as table_hit_addr |
| pool_addr_offset | 24 | table_hit_addr = pool_hit_addr + pool_addr_offset |

| Field | width | Description |
|---|---|---|
| | | Request (input) |
| command_enable | 4 | |
| profile_ID | 3 | |
| request_ID | 6 | |
| master_key | 384 | |
| | | Result lane (output, 4 lanes per search logic unit) |
| request_ID | 6 | |
| hit | 1 | |
| sorry | 1 | |
| hit_addr | 20 | |
| data | 64 | |

202 (Request rows), 204 (Result rows)

FIG. 2

| Field | width | Description |
|---|---|---|
| table_ID | 8 | Table ID infers table type |
| use_tcam_pool | 1 | A wild-card match table may use both SRAM and TCAM pools |
| use_sram_pool | 1 | |
| use_left_group | 1 | A table may use memory from more than one group |
| use_right_group | 1 | |
| sram_pool_start | 3 | Each table may span across multiple SRAM pools |
| sram_pool_end | 3 | |
| tcam_pool_start | 1 | Each table may span across multiple TCAM pools |
| tcam_pool_end | 1 | |
| key_map | 48 | Form table search key with 8-bit granularity |
| age_mark_en | 1 | |
| regrettable | 1 | |
| key_size | 6 | In unit of byte |
| ECMP_en | 1 | |
| ECMP_hash_start | 6 | ECMP hash occupies 10 consecutive bits of the master key |
| rslt_lane_start | 4 | 64-bit data each lane, eight logic lanes for data return |
| rslt_lane_inc | 3 | |

| Field | Width | Description |
|---|---|---|
| | | Per SRAM pool |
| key_size | 4 | 32/64/72/128/144/256-bit key, table with 256-bit key stores key in tile 0 and data in tile 1 of a pair |
| bucket_cnt | 4 | 1/2/4 entries per SRAM row |
| tile_start | 4 | |
| tile_end | 4 | |
| way_hash_seed_{0..15} | 11 X 16 | Seed for CRC hash function |
| pool_addr_offset | 24 | table_hit_addr = pool_hit_addr + pool_addr_offset |
| pool_extension | 1 | If set, table also occupies the extension pool. |

| Field | Width | Description |
|---|---|---|
| | | Per table |
| pool_bmp | 6 | A table may span multiple SRAM pools |
| pool_addr_start_{0..5} | 24 X 6 | Each SRAM pool stores part of the table ranging between two addresses. |
| pool_addr_end_{0..5} | 24 X 6 | |
| | | Per SRAM pool |
| tile_start | 4 | |
| tile_end | 4 | |
| data_size | 4 | 32/64/128/256/512-bit control data |

| Field | Width | Description |
|---|---|---|
| | | Per SRAM pool, prefix table |
| tile_start | 4 | tile_start <= tile_end <= 9, maximum 10 tiles for prefixes. |
| tile_end | 4 | |
| hash_seed_way_{0..9} | 11 X 10 | Seed for CRC hash function |
| tread_{0..9} | 8 X 10 | Number of MSB to hash from |
| pool_extension | 1 | If set, table also occupies the extension pool. |
| | | Per SRAM pool, NHI table |
| tile_start | 4 | |
| tile_end | 4 | |
| pair_per_entry | 4 | A NHI table entry is 128-bit, containing multiple pairs of {NH_blk_size, NH_blk_addr} |
| nhi_size | 5 | |
| | | Per SRAM pool, NH table |
| tile_start | 4 | |
| tile_end | 4 | |
| data_size | 4 | In unit of 32-bit word |
| return_nhi_addr | 1 | Return nhi_addr or nh_addr as table_hit_addr |
| pool_addr_offset | 24 | table_hit_addr = pool_hit_addr + pool_addr_offset |

FIG. 8

| Field | Width | Description |
|---|---|---|
| | | Per TCAM pool |
| db_start | 3 | TCAM DB usage within this pool |
| db_end | 3 | |
| key_size | 4 | 64/128/192/384-bit key |
| data_size | 4 | 32/64/128/256/512-bit control data |
| pool_addr_offset | 1 | table_hit_addr = pool_hit_addr + pool_addr_offset |

| Field | Width | Description |
|---|---|---|
| | | Per TCAM pool |
| db_start | 3 | TCAM DB usage within this pool |
| db_end | 3 | |
| key_size | 4 | 64/128/192/256-bit key |
| data_size | 4 | In unit of byte |
| | | Per SRAM pool |
| key_size | | 96/128/192/256-bit key |
| key_tile_start | 4 | key_tile_start <= key_tile_end <= 9, maximum 10 tiles for key storage |
| key_tile_end | 4 | |
| key_map_way_{0..9} | 32 X 10 | Mask for bits that participates in hashing, 4/4/6/8-bit granularity for 96/128/192/256-bit key, respectively |
| hash_seed_way_{0..9} | 11 X 10 | |
| data_size | 4 | In unit of byte |
| data_tile_start | 4 | |
| data_tile_end | 4 | |

FIG. 11

APPARATUS AND METHOD FOR SCALABLE AND FLEXIBLE TABLE SEARCH IN A NETWORK SWITCH

TECHNICAL FIELD

The present application relates to communications in network environments. More particularly, the present invention relates to performing table searches in a high speed network processing unit.

BACKGROUND

Network switches/switching units are at the core of any communication network. A network switch typically has one or more input ports and one or more output ports, wherein data/communication packets are received at the input ports, processed by the network switch through multiple packet processing stages, and routed by the network switch to other network devices from the output ports according to control logic of the network switch.

Table search has been widely adopted for the control logic of the network switch, wherein the network switch performs search/lookup operations on the tables stored in the memory of the switch for each incoming packet and takes actions as instructed by the table search results or takes a default action in case of a table search miss. Examples of the table search performed in the network switch include but are not limited to: hashing for a Media Access Control (MAC) address look up, Longest-Prefix Matching (LPM) for Internet Protocol (IP) routing, wild card matching (WCM) for an Access Control List (ACL) and direct memory access for control data. The table search in the network switch allows management of network services by decoupling decisions about where traffic/packets are sent (i.e., the control plane of the switch) from the underlying systems that forwards the packets to the selected destination (i.e., the data plane of the switch), which is especially important for Software Defined Networks (SDN).

Traditionally, table search are performed by fixed function packet processing pipeline having multiple stages in the network switch, wherein each fixed function packet processing stage in the pipeline has its own dedicated memory to store the tables to be accessed by the fixed function packet processing stage. The memory dedicated to one fixed function packet processing stage cannot be accessed by other fixed function packet processing stage and any change to the tables and/or the fixed function packet processing pipeline would require redesign of the network switch. Some network switch adopts flexible packet processing, where a logical table can be stored across multiple physical memories assigned to different flexible function packet processing stages in the pipeline and accessed by a single flexible function packet processing stage. Some network switch with flexible packet processing capabilities further adopts a centralized memory pool, where a plurality of flexible memory pools are grouped together via interconnects on the network switch and can be accessed by any of the flexible function packet processing stages.

The foregoing examples of the related art and limitations related therewith are intended to be illustrative and not exclusive. Other limitations of the related art will become apparent upon a reading of the specification and a study of the drawings.

SUMMARY

A network switch comprises a packet processing pipeline including a plurality of packet processing clusters configured to process a received packet through multiple packet processing stages based on table search/lookup results. The network switch further includes a plurality of search logic units each corresponding one of the plurality of packet processing clusters, wherein each of the search logic units is configured to convert a unified search request of a table from its corresponding packet processing cluster to a plurality table search commands specific to one or more memory clusters that maintain the table, provide the plurality table search commands specific to the memory clusters in parallel and collect and provide the table search results from the memory clusters to the corresponding packet processing cluster. The network switch further includes said one or more memory clusters configured to maintain the table to be searched, search the table in parallel according to the plurality table search commands from the search logic unit, and process and provide the table search results to the search logic unit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

FIG. 2 illustrates examples of formats used for communications between a requesting LDE and its corresponding search logic unit in accordance with some embodiments.

FIG. 3 depicts an example of configuration of a table search command in a search profile generated by the search logic unit to conduct a plurality of table searches in parallel on the memory clusters in accordance with some embodiments.

FIG. 6 depicts an example of configuration of a hash table used for address lookup in accordance with some embodiments.

FIG. 7 depicts an example of configuration of a direct access table configured for direct table access in accordance with some embodiments.

FIG. 8 depicts an example of configuration of a LPM table configured for IP address searches in accordance with some embodiments.

FIG. 10 depicts an example of configuration of a TCAM table configured for TCAM searches in accordance with some embodiments.

FIG. 11 depicts an example of configuration of a hybrid WCM table configured for WCM searches in accordance with some embodiments.

DETAILED DESCRIPTION

Figure 1:
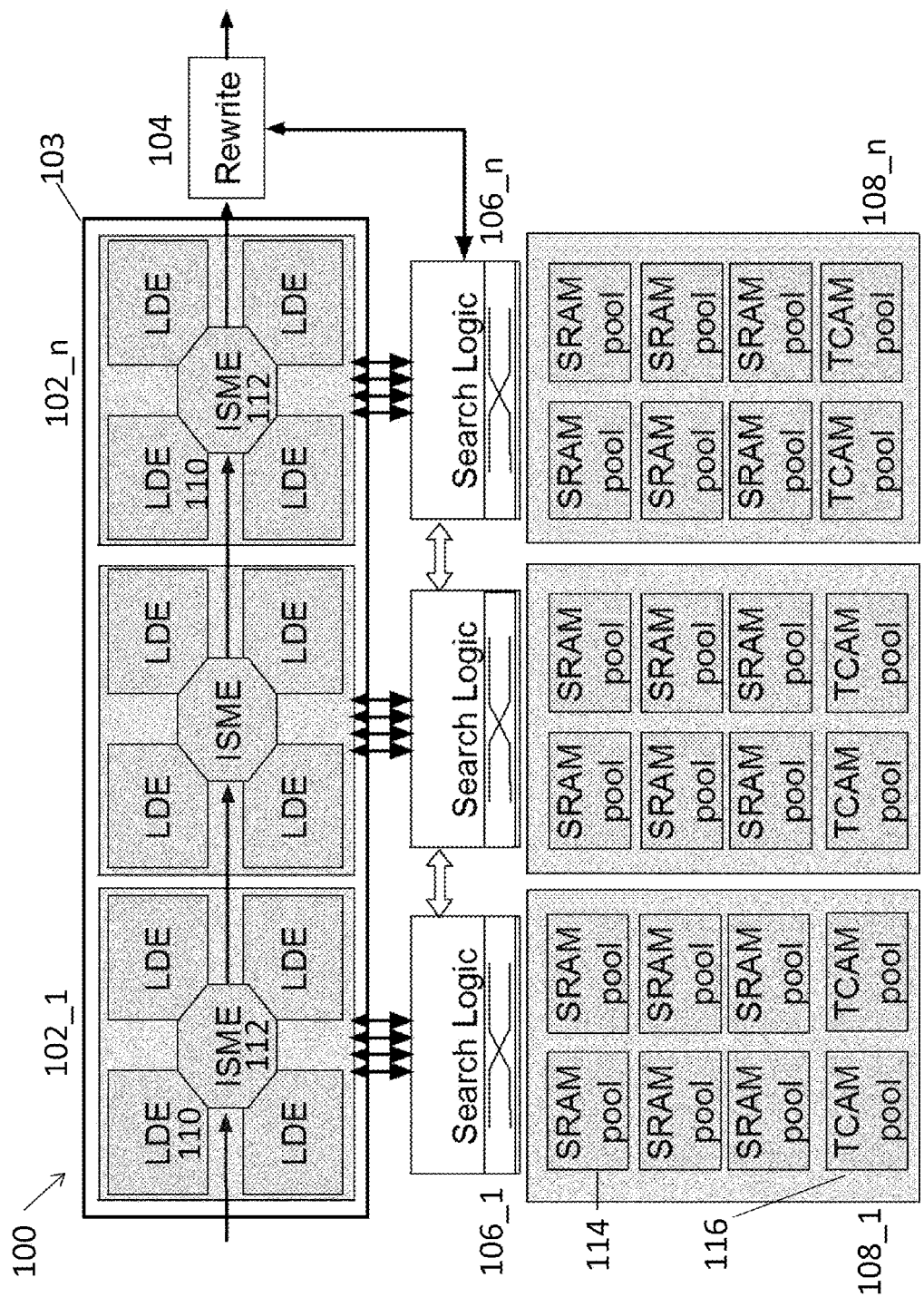
FIG. 1 illustrates an example of a diagram of a network switch configured to support scalable and flexible table search in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates an example of a diagram of a network switch 100 configured to support scalable and flexible table search. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, the network switch 100 includes a plurality of packet processing clusters 102_1 through 102_n in a flexible packet processing pipeline 103 configured to process a received data/communication packet through multiple stages based on table search results. The network switch 100 further includes a packet modifier/rewriter 104 configured to modify and rewrite the packet (e.g., strip the header of the packet) processed by the packet processing pipeline 103 to comply with protocols for transmission over a network. Each of the packet processing clusters 102s in the packet processing pipeline 103 interacts with its corresponding search logic unit 106 in the network switch 100, which serves as the interface between the packet processing cluster 102 and one or more memory clusters 108s configured to maintain the tables to be searched by the packet processing cluster 102.

In the example of FIG. 1, each of the packet processing clusters 102s further comprises a plurality of lookup and decision engines (LDEs) 110s. As one of the processing stages in the packet processing pipeline 103, each LDE 110 is configured to generate a master table lookup key for a packet received and to process/modify the packet received based on search results of the tables of the master table lookup key. Specifically, the LDE 110 examines specific fields and/or bits in the packet received to determine conditions and/or rules of configured protocols and generates the master lookup key accordingly based on the examination outcomes. The LDE 110 also checks the table search results of the master lookup key to determine processing conditions and/or rules and to process the packet based on the conditions and/or rules determined. Here, the conditions and/or rules for key generation and packet processing are fully programmable are fully programmable by software and are based on network features and protocols configured for processing stage of the LDE 110.

In the example of FIG. 1, each of the packet processing clusters 102s further includes an interconnect scheme management element (ISME) 112 configured to manage interconnect configurations of the LDEs 110s in the packet processing cluster 102 and to route packets among the LDEs 110s from one packet processing stage to another. Once the packet has been processed by all relevant LDEs 110s in a packet processing cluster 102, the ISME 112 is configured to deliver the packet to the next packet processing cluster 102 for further processing. The ISME 112 in the last packet processing cluster 102_n of the packet processing pipeline 103 is configured to route the packet to the packet modifier/rewriter 104 for rewrite for delivery over the network.

In the example of FIG. 1, each packet processing cluster 102 has its own corresponding local memory cluster 108, which the packet processing cluster 102 interacts with for search of the tables stored there through its corresponding search logic unit 106. In some embodiments, each packet processing cluster 102 is further configured to access other (e.g., neighboring) memory clusters 108s in addition to or instead of its local memory cluster 108 through its corresponding search logic unit 10, if the tables to be searched are stored across multiple memory clusters 108s as discussed below.

In the example of FIG. 1, a search logic unit 106 associated with each of the each of the packet processing clusters 102s is configured to accept and process a unified table request from its corresponding packet processing cluster 102, wherein the unified table request includes the master lookup key. In some embodiments, the unified table request may also be sent by the packet modifier/rewriter 104 or a another/neighboring packet processing cluster 102. The search logic unit 106 identifies the one or more memory clusters 108s that maintain the tables to be searched, constructs a plurality of search keys specific to the memory clusters 108s based on the master lookup key and transmit a plurality of table search requests/commands to the memory clusters 108s in parallel, wherein the search request/command to each of the memory clusters 108s includes identification/type of the tables to be searched and the search key specific to the memory cluster 108. In some embodiments, the search logic unit 106 is configured to generate the search keys having different sizes to perform different types of table searches/lookups specific to each of the memory clusters 108s in parallel. In some embodiments, the sizes of the search keys specific to the memory clusters 108 are much shorter than the master lookup key to save bandwidth consumed between the search logic unit 106 and the memory clusters 108s. Once the table search across the memory clusters 108s is done, the search logic unit 106 is configured to collect the search results from the memory clusters 108s and provide the search results to its corresponding packet processing clusters 102 in a unified response format.

FIG. 2 illustrates examples of formats used for communications between the requesting LDE 110 and its corresponding search logic unit 106. As depicted by the example in FIG. 2, the unified table request 202 sent by the LDE 110 to the search logic unit 106 includes the master lookup key, which can be but is not limited to 384 bits in width. The unified table request 202 further includes a search profile ID, which identifies a search profile describing how the table search/lookup should be done as discussed in details below. Based on the search profile, the search logic unit 106 can then determine the type of table searched/lookup, the memory clusters 108s to be searched, and how the search keys specific to the memory clusters 108s should be formed. Since there are three bits for the profile ID in this example, there can be up to eight different search profiles. The unified table request 202 further includes a request_ID and a command_enable field, representing the type of the request and the search command to be used, respectively.

FIG. 3 depicts an example of configuration of a table search command 300 in a search profile generated by the search logic unit 106 to conduct a plurality of table searches in parallel on the memory clusters 108s. A search profile may include configurations for all such table search commands. As shown in the example in FIG. 3, the table search command 300 include information on the types of memory clusters/pools to be searched in parallel, the identification of the memory clusters/pools to be searched, the types of table search/lookup to be performed, how the search keys should be generated from the master lookup key that are specific to the memory pools, and how the search results should be provided back to the requesting LDE 110. Here, the table search command 300 indicates whether the search will be performed to the memory cluster 108 local to the requesting LDE 110 and the search logic unit 106 and/or to one or more neighboring memory clusters 108s in parallel as well. The search range within each of the memory clusters 108s is also included in the search profile.

In the example of FIG. 1, the memory clusters 108s are configured to search the table(s) identified in the search quests from the search logic unit 106 using their respective search keys in parallel. In some embodiments, the table to be searched may reside entirely in one memory cluster 108. In some embodiments, the table may reside across multiple memory clusters 108, wherein each of the memory clusters 108 maintains a portion (e.g., a plurality of rows and/or columns) of the table. Since the search is performed by the memory clusters 108s in parallel, the memory clusters 108s are able to provide the search results (e.g., hit or miss) to the search logic unit 106 concurrently at the same time.

In the example of FIG. 1, each memory cluster 108 includes a variety of memory types that include but are not limited to a plurality of static random-access memory (SRAM) pools 114s and/or ternary content-addressable memory (TCAM) pools 116s. Here, the SRAM pools 114s support direct memory access and each TCAM pool 116 encodes three possible, i.e. 0 and 1 and X for don't-care per bit, for additional flexibility. A TCAM pool 116 is often used for longest prefix match (LPM) and access control list (ACL) searches.

In some embodiments, the SRAM and/or TCAM pools can be flexibly configured to accommodate and store different table types as well as entry widths. Certain applications requires large search tables while some other applications desire multiple smaller search tables for packet processing. The division of each memory cluster 108 into multiple separate pools for parallel memory accesses allows greater flexibility.

Figure 4:
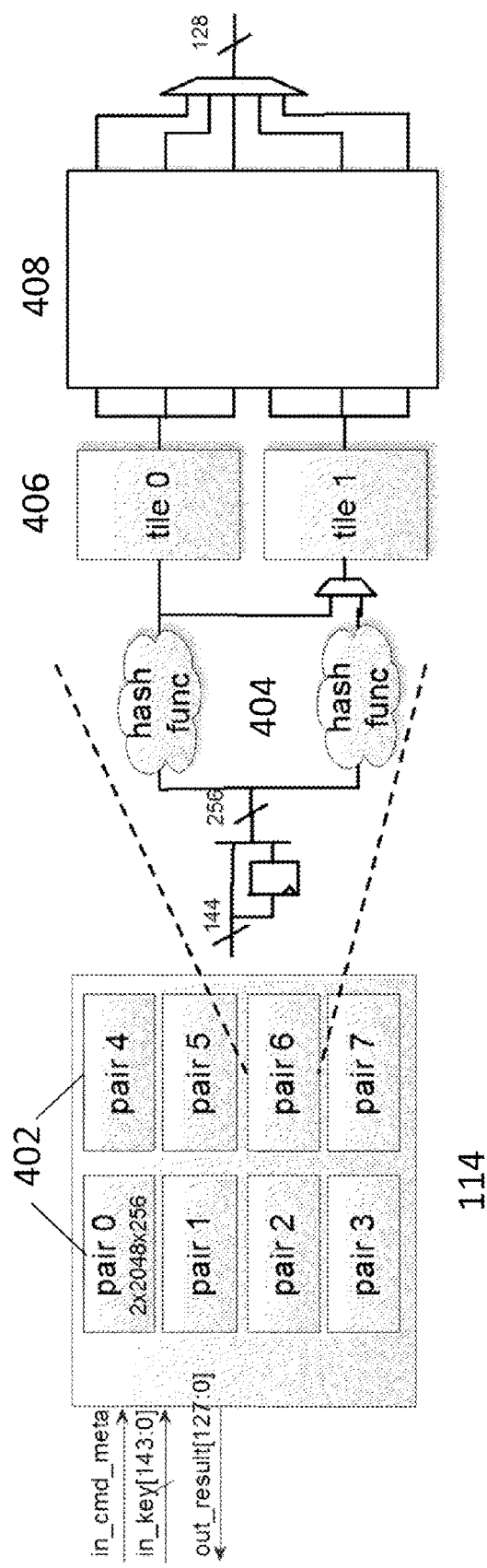
FIG. 4 depicts an example of configuration of components in a SRAM pool in FIG. 1 in accordance with some embodiments.

FIG. 4 depicts an example of configuration of components in a SRAM pool 114 in FIG. 1. In the example of FIG. 4, each SRAM pool includes a plurality of memory tiles 406 organized into pairs 402s each having a hash function circuitry 404, two memory tiles 406s, and a data processing circuitry 208. For a non-limiting example, each memory tile 406 can be 256 bits wide and 2048 rows deep.

Figure 5:
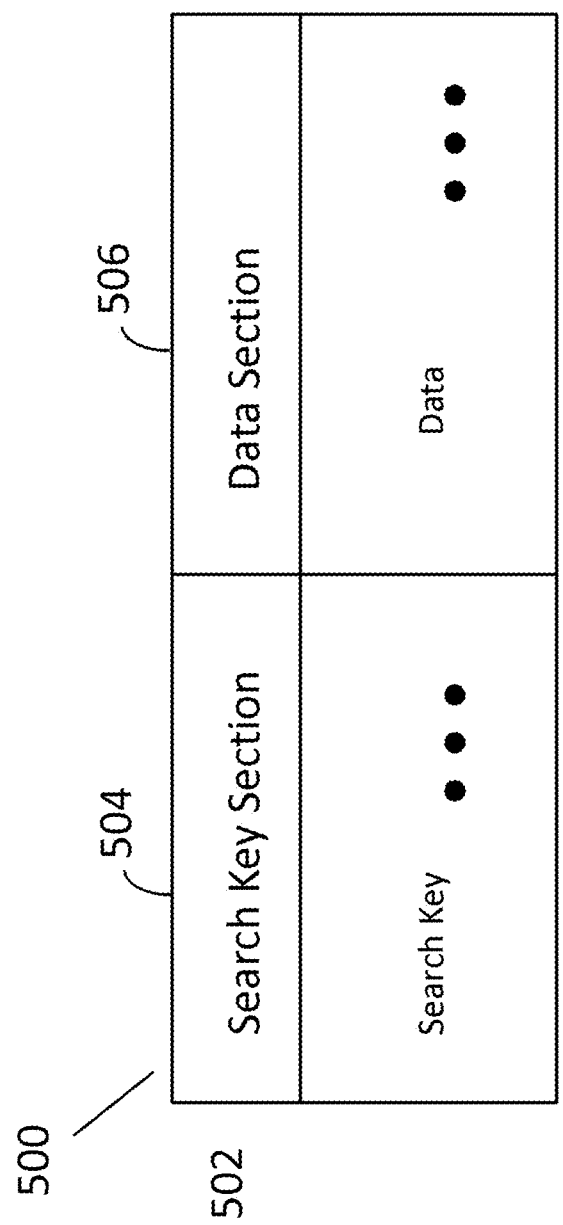
FIG. 5 depicts an example of configuration of a table maintained in the SRAM pool in accordance with some embodiments.

FIG. 5 depicts an example of configuration of a table 500 maintained in the SRAM pool 114, wherein each entry 502 in the table 500 has a key section 504 and a data section 506. In some embodiments, tables 500 stored within a SRAM pool 114 are assigned in row blocks, where each row block has a plurality (e.g. 1024) of memory rows. Here, each row block is an intermediate representation in between high-level table address and physical memory address, which allows a decoupling of the logic view of the memory pool 114 from the physical tiles in the pool. For non-limiting examples, each entry 502 in table 500 can be 32-bits, 64-bits, 128-bits, 256-bits or 512-bits in width, wherein each physical SRAM pool 114 each 256-bits wide. In some embodiments, both the key section 504 and the data section 506 of a table entry 502 are stored within one memory tile 406. If the table entry is less than 256-bits wide, multiple entries 502 can reside in one SRAM row, with lower bits of logic table addresses used to select the one of the multiple entries in the same row, and upper bits of logic table addresses used to select the memory row and memory tile 406. If an entry 502 is 512-bits wide, it uses two SRAM tiles 206, wherein one memory tile (e.g., the 0) in the pair 202 holds the key and the other tile (e.g., the 1) in the same pair 402 holds the data. A dual-tile-entry stores its lower 256-bits in even-numbered tiles, and its higher 256-bits in the same row in the immediate next tile. While each tile 406 has a maximum of one access each clock cycle, multiple tables 500 can reside in the same tile 406, allowing for access to each table 500 in time-domain-multiplexing fashion. Typically, depending on packet parsing results, different packets from the same source may require different lookups. Consequently multiple tables 500 are maintained in the same memory tile 406, but are accessed for different packets if the pipeline 103 provides large table capacity. With a minimum table size being 1024 entries, the largest table, however, can occupy all the SRAM resources. Size of the tables can be traded off with number of the tables with different requirements of each specific network application.

During operation, the hash function circuitry 404 in the pair 402 is configured to generate an address for the table entries in the pair 402 based on the information in the search request from the search logic unit 106. A table entry is extracted from the SRAM tile 406 or pair 402 based on the address. The data processing circuitry 408 then extracts the key from the table entry, and matches the keys with the search key in the search request from the search logic unit 106. If a match or hit is found for an entry, the corresponding data in the entry is retrieved. In the case where a table spans multiple SRAM pairs 402, multiple table entries may happen and they are arbitrated to return exactly one result data back to the search logic. The search logic unit 106 again arbitrates search result from multiple memory pools to return one result for each table search to LDE 110. In some embodiments, the hash function circuitry 404 utilizes a hash table configuration stored in the SRAM pool 114 of the pair 402 to generate the hit address for the table entries in the pair 402. FIG. 6 depicts an example of configuration of the hash table used by the hash function circuitry 404 for the address lookup and data processing circuitry 408 for the entry matching, wherein the hash table configuration includes information on, for non-limiting examples, size of the key, which tiles to use, how to do hashing, and how to calculate the hit address.

In some embodiments, the pair 402 in SRAM pool 114 allows direct memory access based on memory address directly without hashing. FIG. 7 depicts an example of configuration of a direct access table 700, wherein the direct access table includes information on whether the table span over multiple SRAM pools, the starting and ending address of the table within each pool, and the tiles storing the table in the pools. The direct access table may further includes data size, which can be but is not limited to 32, 64, 128 or 256 bits. The per table configuration is used by the search logic 106 for memory pool access and per SRAM pool configuration is used by SRAM pool to firstly distribute the table access to SRAM tile/pair and then data processing by the data processing circuitry 408.

Once retrieved from the table, the key and the data of the matched/hit table entry are then processed by the data processing circuitry 408. Here, the data processing circuitry 408 is configured to perform one or more different types of matching functions that include but are not limited to longest prefix matching (LPM) for Internet Protocol (IP) routing address in SRAM pool 114, and hybrid wild card matching (WCM) for SRAM pool 114. Note that WCM table matching may also involve TCAM pool 116 as discussed below.

FIG. 8 depicts an example of configuration of a LPM table 800 for IP address searches on SRAM pools 114 configured by the data processing circuitry 408, wherein the LPM table includes three sub-tables (prefix, NHI, and NH) including information on tile ranges, hash function used, data size, and pool address offset, etc. The information included in the tables are used by the data processing circuitry 408 to look for the longest prefix match in the data retrieved from the hit table entry.

Figure 9:
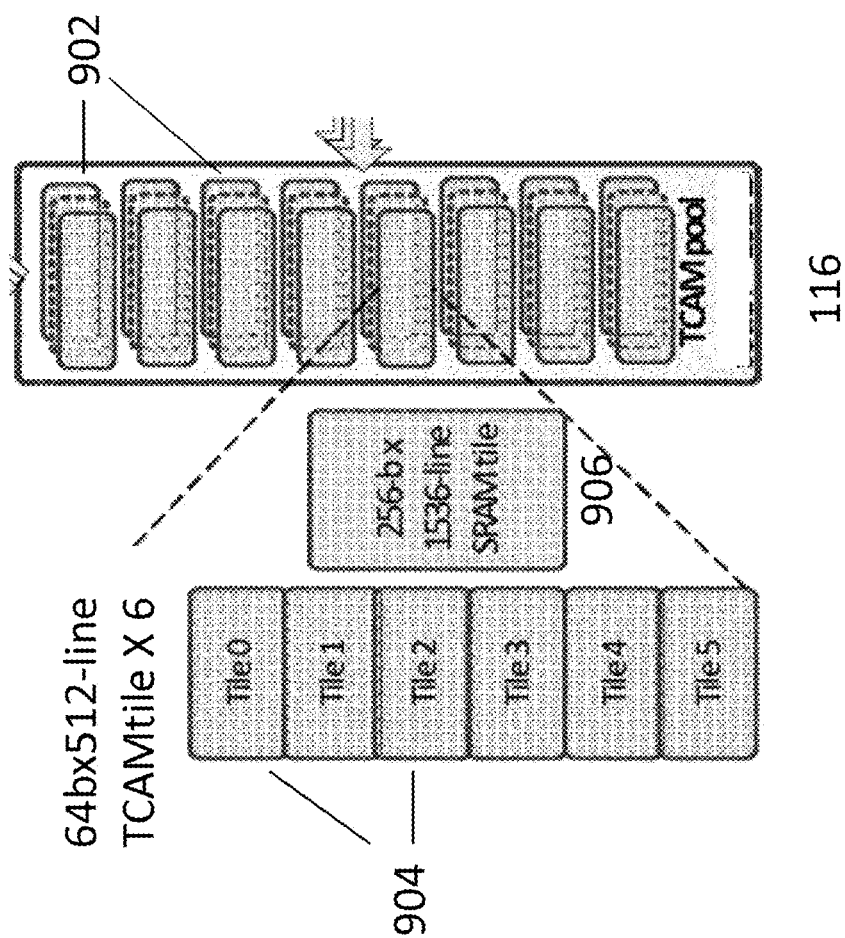
FIG. 9 depicts an example of configuration of components in a TCAM pool in FIG. 1 in accordance with some embodiments.

FIG. 9 depicts an example of configuration of components in a TCAM pool 116 in FIG. 1. In the example of FIG. 9, the TCAM pool 116 is organized into multiple databases 902, wherein each database 902 include a plurality of (e.g., six) TCAM tiles 904 as well as its associated SRAM tile 906. The TCAM tiles 904 are utilized to store key portion of the table and SRAM tile 906 is utilized to store result data portion of the table. Each TCAM database 902 can be logically configured to support different search key width.

FIG. 10 depicts an example of configuration of a TCAM table 1000 configured for TCAM searches on TCAM pools 116, wherein the TCAM table includes a key size parameter, a database start parameter and a database end parameter, and a data size parameter. In some embodiments, the search key section has allowed sizes of 64, 128, 192 and 384 bits. In some embodiments, the data size may be 32, 64, 128 or 256 bits. TCAM tables are limited to use the TCAM pools 116.

FIG. 11 depicts an example of configuration of a hybrid WCM table 1100 configured for WCM searches, wherein the WCM table configurations includes information both lookup of both SRAM pools 114*s* and TCAM pools 116 as depicted in FIGS. 8 and 10 discussed above.

All of the hash table configuration 600 and LPM table configuration 800 discussed above are maintained by the SRAM pool 114 on a per pool configuration basis and are utilized by the pairs 402 and tiles 404 of the pool to access the table and process the hit table entries. Direct access table configuration 700 is maintained by the search logic 106 as well as SRAM pool 114 on a per pool basis. The TCAM table configuration 1000 is maintained by TCAM pools on a per pool basis, and the hybrid WCM table configuration 1100 spans across SRAM pools and TCAM pools on a per pool basis.

Following the matching by the data processing circuitry 408, per SRAM pool 114 then consolidates data from each pair and then returns the processed data (e.g., maximum of 128 bits of parallel data) back to the search logic component 106. Based on table type, each TCAM pool may also return processed result data back to search logic component 106. It then consolidates the returned data from each of the memory clusters 108*s* conducting the search of the table and transmits the lookup result back to the requesting LDE 110 to process the packet accordingly.

In some embodiments, the search logic unit 106 is configured to transmit the lookup result back to the requesting LDE 110 of a packet processing cluster 102 in the unified response format as a plurality of (e.g., four) result lanes 204 as depicted in the example of FIG. 2, wherein each result lane represents a portion of the search results. As depicted in FIG. 2, each result lane 504 has a data section representing a portion of the search result (e.g., 64 bits wide), the same request_ID as in unified table request 202, a hit indicator and a hit address where a matching table entry is found. As such, the search logic component 106 may take multiple cycles to return the complete search results to the requesting LDE 110.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A network switch to support scalable and flexible table search, comprising:
   a packet processing pipeline including a plurality of packet processing clusters configured to process a received packet through multiple packet processing stages based on table search/lookup results;
   a plurality of search logic units each corresponding one of the plurality of packet processing clusters, wherein each of the search logic units is configured to:
      convert a unified table search request from its corresponding packet processing cluster to a plurality table search commands specific to one or more memory clusters that maintain a plurality of tables;
      provide the plurality table search commands specific to the memory clusters in parallel;
      collect and provide the table search results from the memory clusters to the corresponding packet processing cluster;
   said one or more memory clusters configured to:
      maintain the tables to be searched;
      search the tables in parallel according to the plurality table search commands from the search logic unit;
      process and provide the table search results to the search logic unit;
   wherein each of the memory clusters includes one or more of static random-access memory (SRAM) pools and ternary content-addressable memory (TCAM) pools, wherein each of the SRAM pools includes a plurality of memory pairs each having a hash function circuitry, two memory tiles, and a data processing circuitry and each of the TCAM pools includes a plurality of TCAM databases each having a plurality of TCAM tiles and SRAM tiles.

2. The network switch of claim 1, further comprising:
   a packet modifier configured to modify and rewrite the packet processed by the packet processing pipeline to comply with a transmission protocol over a network.

3. The network switch of claim 1, wherein:
   each of the packet processing clusters has its own corresponding local memory cluster.

4. The network switch of claim 3, wherein:
   each of the packet processing clusters is configured to access other memory clusters in addition to or instead of its local memory cluster through its corresponding search logic unit.

5. The network switch of claim 1, wherein:
   each of the packet processing clusters further comprises a plurality of lookup and decision engines (LDEs) wherein each of the LDEs is configured to:
      generate a master table lookup key for the packet;
      include the master table lookup key in the unified table request;
      process/modify the packet based on the table search results.

6. The network switch of claim 5, wherein:
each of the packet processing clusters further comprises an interconnect scheme management element (ISME) configured to manage interconnect configurations of the LDEs in the packet processing cluster and to route the packet among the LDEs from one packet processing stage to another.

7. The network switch of claim 5, wherein:
the search logic unit is configured to:
construct a plurality of search keys specific to the memory clusters based on the master lookup key;
include the search keys in the table search commands specific to the memory clusters.

8. The network switch of claim 7, wherein:
the search keys to the memory clusters have different sizes and perform different types of table searches specific to each of the memory clusters in parallel.

9. The network switch of claim 1, wherein:
the search logic unit is configured to:
maintain a search profile describing how the table search/lookup should be done;
generate the plurality of parallel table search commands based on the search profile.

10. The network switch of claim 1, wherein:
the table resides entirely on only one of the memory clusters.

11. The network switch of claim 1, wherein:
the table resides across multiple memory clusters, wherein each of the memory clusters maintains a portion of the table.

12. The network switch of claim 1, wherein: each entry in the table has key section and a data section, wherein both the key section and the data section of the table entry are stored within one row of one of the memory tiles.

13. The network switch of claim 1, wherein: each entry in the table has key section and a data section, wherein the key section and the data section of the table entry are stored on the same memory tile or two different memory tiles.

14. The network switch of claim 1, wherein: the memory pair is configured to: generate an address for table entries in the memory pair based on the search command from the search logic unit; extract a key from at the address, match the key with the search key in the search command; retrieve corresponding data in the entry at the address if a match or hit is found.

15. The network switch of claim 1, wherein: each of the pairs in the memory pool allows direct memory access to retrieve data based on memory address directly without hashing.

16. The network switch of claim 1, wherein: the data processing circuitry is configured to perform one or more different types of matching functions on data retrieved from the table on per pool configuration basis.

17. The network switch of claim 16, wherein:
the data processing circuitry is configured to perform longest prefix matching (LPM) on the data on per pool configuration basis.

18. The network switch of claim 1, wherein: each TCAM pool is configured to perform TCAM table lookup on the data for don't care or X states on per pool configuration basis.

19. The network switch of claim 1, wherein: each memory cluster is configured to perform hybrid wild-card matching (WCM) for both SRAM and TCAM memory pools on per pool configuration basis.

20. The network switch of claim 1, wherein:
the search logic unit is configured to provide the table search results from the memory clusters to the corresponding packet processing cluster in a unified response format as a plurality of result lanes, wherein each result lane represents a portion of the search results.

21. A method to support scalable and flexible table search in a network switch, comprising:
processing a received packet through multiple packet processing stages based on table search/lookup results via a plurality of packet processing clusters in a packet processing pipeline;
converting a unified search table request from one of the packet processing clusters to a plurality table search commands specific to one or more memory clusters that maintain a plurality of tables;
providing the plurality table search commands specific to the memory clusters in parallel;
searching the tables in parallel according to the plurality table search commands;
collecting and providing the table search results from the memory clusters to the packet processing cluster;
wherein each of the memory clusters includes one or more of static random-access memory (SRAM) pools and ternary content-addressable memory (TCAM) pools, wherein each of the SRAM pools includes a plurality of memory pairs each having a hash function circuitry, two memory tiles, and a data processing circuitry, and each of the TCAM pools includes a plurality of TCAM databases each having a plurality of TCAM tiles and SRAM tiles.

22. The method of claim 21, further comprising:
modifying and rewriting the packet processed by the packet processing pipeline to comply with a transmission protocol over a network.

23. The method of claim 21, further comprising:
generating a master table lookup key for the packet;
including the master table lookup key in the unified table request;
processing/modifying the packet based on the table search results.

24. The method of claim 23, further comprising:
constructing a plurality of search keys specific to the memory clusters based on the master lookup key;
including the search keys in the table search commands specific to the memory clusters.

25. The method of claim 21, further comprising:
maintaining a search profile describing how the table search/lookup should be done;
generating the plurality of parallel table search commands based on the search profile.

26. The method of claim 21, further comprising: generating an address for table entries in one of the memory pairs based on the search command; extracting a key from at the address, matching the key with the search key in the search command; retrieving corresponding data in the entry at the address if a match or hit is found.

27. The method of claim 21, further comprising: allowing direct memory access to retrieve data based on memory address directly without hashing.

28. The method of claim 21, further comprising: performing one or more different types of matching functions on data retrieved from the table on per pool configuration basis.

29. The network switch of claim 28, further comprising:
performing longest prefix matching (LPM) on the data on per pool configuration basis.

30. The network switch of claim 28, further comprising:
performing TCAM table lookup on the data for don't care or X states on per pool configuration basis.

31. The network switch of claim 28, further comprising:
performing hybrid wild-card matching (WCM) for both SRAM and TCAM memory pools on per pool configuration basis.

32. The method of claim 21, further comprising:
providing the table search results from the memory clusters to the corresponding packet processing cluster in a unified response format as a plurality of result lanes, wherein each result lane represents a portion of the search results.

* * * * *